(12) United States Patent
Ai et al.

(10) Patent No.: US 11,097,990 B2
(45) Date of Patent: Aug. 24, 2021

(54) METHOD FOR PREPARING ORGANIC MULTI-MICRO-FERTILIZER WITH WATER RETENTION FUNCTION AND MICRO-FERTILIZER PREPARED THEREBY

(71) Applicant: Shenghao Ai, Sichuan (CN)

(72) Inventors: Shenghao Ai, Sichuan (CN); Xiaoyan Ai, Sichuan (CN); Yingwei Ai, Sichuan (CN)

(73) Assignee: Shenghao Ai, Sichuan (CN)

( * ) Notice: Subject to any disclaimer, the term of this patent is extended or adjusted under 35 U.S.C. 154(b) by 126 days.

(21) Appl. No.: 16/560,812

(22) Filed: Sep. 4, 2019

(65) Prior Publication Data

US 2019/0389784 A1   Dec. 26, 2019

(30) Foreign Application Priority Data

Oct. 22, 2018   (CN) .......................... 201811226229.1

(51) Int. Cl.
| | | |
|---|---|---|
| C05D 9/02 | (2006.01) |
| C05F 11/00 | (2006.01) |
| C05F 11/02 | (2006.01) |
| C05C 3/00 | (2006.01) |
| C05C 9/00 | (2006.01) |
| C05C 11/00 | (2006.01) |
| C05D 5/00 | (2006.01) |
| C05G 5/12 | (2020.01) |

(52) U.S. Cl.
CPC ............... *C05F 11/02* (2013.01); *C05C 3/00* (2013.01); *C05C 9/00* (2013.01); *C05C 11/00* (2013.01); *C05D 5/00* (2013.01); *C05D 9/02* (2013.01); *C05F 11/00* (2013.01); *C05G 5/12* (2020.02)

(58) Field of Classification Search
None
See application file for complete search history.

(56) References Cited

U.S. PATENT DOCUMENTS

2018/0325105 A1* 11/2018 Vadakekuttu ............. C05G 3/60
2019/0274311 A1*  9/2019 Harman ................. A01N 25/04

* cited by examiner

*Primary Examiner* — Wayne A Langel

(57) ABSTRACT

A method for preparing organic multi-micro-fertilizer with water retention function is provided, including: effectively remixing substance containing organic multiple trace elements, attapulgite powder, sodium p-toluenesulfonate, vermiculite and perlite under certain conditions. The present invention has obvious effects on enhancing soil water-holding performance, preventing physiological diseases of crops caused by lack of trace elements, and promoting growth and development of the crops.

2 Claims, No Drawings

METHOD FOR PREPARING ORGANIC MULTI-MICRO-FERTILIZER WITH WATER RETENTION FUNCTION AND MICRO-FERTILIZER PREPARED THEREBY

CROSS REFERENCE OF RELATED APPLICATION

The present application claims priority under 35 U.S.C. 119(a-d) to CN 201510172685.2, filed Apr. 13, 2015.

BACKGROUND OF THE PRESENT INVENTION

Field of Invention

The present invention relates to a fertilizer, and most particularly related to a method for preparing an organic multi-micro-fertilizer with water retention function and a corresponding micro-fertilizer prepared thereby.

Description of Related Arts

Trace elements play an equally important physiological role as macro-elements in the normal growth and development of crops. The lack of trace elements in soil directly affects the normal growth and development of crops, resulting in low yield and instability, and degraded quality. Trace element fertilizer is an important substance for supplying essential nutrients to crops, improving soil properties and improving soil fertility. The application of trace element fertilizer is an important measure to increase the yield of crops. The application of trace element fertilizers in different crops in different regions has a very apparent effect in increasing yield, generally reaching 5% to 30%. The application of trace element fertilizers not only improves crop yields, but also improves the quality of agricultural products. The water shortage caused by soil drought seriously affects the life activities such as crop growth, development and reproduction, and significantly reduces the biomass, yield and harvest index of crops, which has always been an important factor restricting crop production in China. More than half of the farmland soil in China lacks one or more trace elements. Soil drought and water shortage will reduce soil biochemical activity, and can also induce soil trace elements. In the practice of agricultural production, soil scarcity and soil water shortage often occur simultaneously. It is not only necessary to apply trace element fertilizer to adjust nutrient balance, but also to maintain water to control soil drought. However, due to the lack of a targeted, well-matched organic multi-micro-fertilizer formula, the conventional organic multi-micro-fertilizer fails to have the function of retaining moisture, and there are problems such as single variety, inefficient efficacy, and poor use effect.

SUMMARY OF THE PRESENT INVENTION

An object of the present invention is to provide a method for preparing an organic multi-micro-fertilizer with water retention function and a micro-fertilizer prepared thereby, so as to overcome the shortcomings in the conventional art. The present invention has the characteristics of easy availability of raw materials, low production cost, comprehensive efficacy, long-lasting fertilizer effect, high biological effectiveness, etc., and has apparent effects on enhancing soil water holding capacity, preventing physiological diseases caused by lack of trace elements in crops, and promoting growth and development of crops.

The object of the present invention is achieved by the following technical effects.

A method for preparing an organic multi-micro-fertilizer with water retention function, comprises following steps of:

step (1) sending at least one member selected from the group consisting of humic acid, sodium alginate and chitin oligosaccharide with a weight percentage of 8-30% into the reaction kettle, and adding at least one member selected from the group consisting of water, ethanol and hydrogen peroxide with a weight percentage at a range of 10-40% to the reaction kettle for dissolving; and then sending at least one member selected from the group consisting of sweet potato starch and wheat starch with a weight percentage at a range of 1-10% into the reaction kettle, and stirring at a temperature at a range of 50-100° C. for 0.2 to 1.5 hours; then adding one or two member selected from the group consisting of polyacrylamide, polyvinyl amide, sodium polyacrylate, polyvinyl alcohol, and potassium polyacrylate to the reaction kettle with a weight percentage at a range of 40-80%; finally adding components to the reaction kettle The weight percentage at a range of 0.1-5% of hydroxyethyl methacrylate, and 0.1-5% of potassium persulfate, so as to react at 60-130° C. for 1-6 hours to obtain a reaction product, solidifying and drying the reaction product, which is denoted as a sample 1;

step (2) sending at least one member selected from the group consisting of thioglycolic acid, tartaric acid, glycerol, humic acid and lysine with a weight percentage at a range of 15-50% into the reaction kettle, and the weight percentage of the components is 30% to 65%; adding at least one member selected from the group consisting of water, hydrogen peroxide, and ethanol for dissolving, stirring at 30-90° C. for 0.2-2 hours; then, adding 5-40% by weight of diglycolamine, acetamide, urea and ethanolamine to the reaction kettle; stirring at 30-90° C. for 0.2 -3 hours to obtain a sample 2;

step (3) sending borax or/and boric acid with a weight percentage of 15-40%, zinc sulfate with a weight percentage of 10-40%, ferrous sulfate with a weight percentage of 5-35%, copper sulfate with a weight percentage of 1-30%, manganese sulfate with a weight percentage of 1-30%, ammonium molybdate with a weight percentage of 0.5-15% into the reaction kettle, and adding the sample 2 with a weight percentage of 30-65% to react at 90-130° C. for 1-6 hours; solidifying, drying and grinding to obtain a sample 3;

step (4) remixing the sample 1 with a weight percentage of 5%-25%, the sample 3 with a weight percentage of 70-90%, attapulgite powder with a weight percentage at arrange of 0.5-5%, sodium p-toluenesulfonate with a weight percentage of 0.5-5%, vermiculite with a weight percentage of 0-5%, and perlite with a weight percentage of 0-5% to obtain a final product.

An organic multi-micro-fertilizer with water retention function prepared by the method mentioned above comprises components of: sample 1, sample 3, attapulgite powder, sodium p-toluene sulfonate, vermiculite and perlite;

wherein the sample 1 comprises: at least one component selected from the group consisting of: humic acid, sodium alginate, chitosan oligosaccharide;

at least one component selected from the group consisting of water, ethanol and hydrogen peroxide; one or more component selected from the group consisting of sweet potato starch and wheat starch;

one or two component selected from the group consisting of acrylamide, polyvinyl amide, sodium polyacrylate, polyvinyl alcohol and potassium polyacrylate;

hydroxyethyl methacrylate; and potassium persulfate;

wherein the sample 3 comprises: at least one component selected from the group consisting of thioglycolic acid, tartaric acid, glycerol, humic acid and lysine;

at least one component selected from the group consisting of Water, hydrogen peroxide and ethanol;

at least one component selected from the group consisting of diglycolamine, acetamide, urea and ethanolamine;

borax or/and boric acid, zinc sulfate, ferrous sulfate, copper sulfate, manganese sulfate and ammonium molybdate.

The present invention has beneficial effects as follows.

The present invention overcomes the deficiencies in the conventional art, and has the characteristics of easy availability of raw materials, low production cost, comprehensive efficacy, long-lasting fertilizer effect, high biological effectiveness, etc. The present invention has apparent effects on the physiological diseases caused by enhancing soil water holding capacity, preventing and controlling crops lacking trace elements, and promoting crop growth and development.

DETAILED DESCRIPTION OF THE PREFERRED EMBODIMENT

Further description of the present invention is illustrated combining with the preferred embodiments as follows.

Example 1

Sending 15% by weight of humic acid into a reaction kettle, adding 23% by weight of water to dissolve; then adding 3% by weight of sweet potato starch to the reaction kettle, stirring at 80° C. for 0.2 hours; adding 58% by weight of polyacrylamide to the reaction kettle; finally adding 0.5% by weight of hydroxyethyl methacrylate; 0.5% by weight of potassium persulfate to the reaction kettle to react at 100° C. for 1 hour, and solidifying and drying a first reaction product, and then pulverizing to obtain a water-retention substance for use. Sending thioglycolic acid with a component weight percentage of 50% into a reaction kettle, dissolving with 40% by weight of water, and stirring at 80° C. for 0.2 hours; then adding diglycolamine with a component weight percentage of 10% to the reaction kettle, stirring at 80° C. for 0.5 hour to prepare a mixed solution containing thioglycolic acid for use. Sending 15% by weight of borax, 13% by weight of zinc sulfate, 10% by weight of ferrous sulfate, 6% by weight of copper sulfate, 5% by weight of manganese sulfate, and 1% by weight of ammonium molybdate into the reaction kettle; adding the mixed solution containing thioglycolic acid with a component weight percentage of 50% to react at 100° C. for 2 hours to obtain a second reaction product, solidifying, drying, and then pulverizing the second reaction product to obtain a substance containing organic multiple trace elements. Remixing 18% by weight of the component with water retention, 80% by weight of the substance containing organic multiple trace elements, 1% by weight of attapulgite powder, 0.5% by weight of sodium p-toluenesulfonate and 0.5% by weight of perlite, so as to obtain a final product.

Field comparison tests showed that the application of the organic multi-micro-fertilizer of the present invention significantly increased field water holding capacity and crop yield compared to the application of Kangpu multi-micronutrient (developed by COMPO GmbH, Germany) and the control without micronutrient (Table 1).

TABLE 1

Effect of organic multi-micro-fertilizer of the invention on field water holding capacity and crop yield

| Treatment | Field capacity (%) | Wheat yield (kg/mu) | Rapeseed yield (kg/mu) | Kiwifruit yield (kg/mu) |
| --- | --- | --- | --- | --- |
| No micro-fertilizer control | 20 | 385 | 172 | 1363 |
| Commodity multi-micro fertilizer (Kang Pu multi-micro fertilizer) | 21 | 396 | 186 | 1491 |
| Organic multi-micro fertilizer of the present invention | 26 | 419 | 201 | 1635 |

Example 2

The preparation procedure was identical to the Example 1. Only the range specified by the operating procedure of the present invention, the types of raw materials, the number of raw materials, and the temperature, stirring time, and reaction time were changed, and an organic multi-micro-fertilizer having a water-retention effect of the present invention was also prepared.

What is claimed is:

1. A method for preparing an organic multi-micro-fertilizer with water retention function, comprising following steps of:

step (1) sending at least one member selected from the group consisting of humic acid, sodium alginate and chitin oligosaccharide with a weight percentage of 8-30% into the reaction kettle, and adding at least one member selected from the group consisting of water, ethanol and hydrogen peroxide with a weight percentage at a range of 10-40% to the reaction kettle for dissolving; and then sending at least one member selected from the group consisting of sweet potato starch and wheat starch with a weight percentage at a range of 1-10% into the reaction kettle, and stirring at a temperature at a range of 50-100° C. for 0.2 to 1.5 hours; then adding one or two members selected from the group consisting of polyacrylamide, polyvinyl amide, sodium polyacrylate, polyvinyl alcohol, and potassium polyacrylate to the reaction kettle with a with a weight percentage at a range of 40-80%; finally adding components to the reaction kettle a weight percentage at a range of 0.1-5% of hydroxyethyl methacrylate, and 0.1-5% of potassium persulfate, so as to react at 60-130° C. for 1-6 hours to obtain a reaction product, solidifying and drying the reaction product, which is denoted as a sample 1;

step (2) sending at least one member selected from the group consisting of thioglycolic acid, tartaric acid, glycerol, humic acid and lysine with a weight percentage at a range of 15-50% into the reaction kettle, and the weight percentage of the components is 30% to 65%; adding at least one member selected from the group consisting of water, hydrogen peroxide, and ethanol for dissolving, stirring at 30-90° C. for 0.2-2 hours; then, adding 5-40% by weight of diglycolamine, acetamide, urea and ethanolamine to the reaction kettle; stirring at 30-90° C. for 0.2-3 hours to obtain a sample 2;

step (3) sending borax and/or boric acid with a weight percentage of 15-40%, zinc sulfate with a weight percentage of 10-40%, ferrous sulfate with a weight percentage of 5-35%, copper sulfate with a weight percentage of 1-30%, manganese sulfate with a weight percentage of 1-30%, ammonium molybdate with a weight percentage of 0.5-15% into the reaction kettle, and adding the sample 2 with a weight percentage of 30-65% to react at 90-130° C. for 1-6 hours; solidifying, drying and grinding to obtain a sample 3;

step (4) remixing the sample 1 with a weight percentage of 5%-25%, the sample 3 with a weight percentage of 70-90%, attapulgite powder with a weight percentage at arrange of 0.5-5%, sodium p-toluenesulfonate with a weight percentage of 0.5-5%, vermiculite with a weight percentage of 0-5%, and perlite with a weight percentage of 0-5% to obtain a final product.

2. An organic multi-micro-fertilizer with water retention function, comprising components of: sample 1, sample 3, attapulgite powder, sodium p-toluene sulfonate, vermiculite and perlite;

wherein the sample 1 comprises: at least one component selected from the group consisting of: humic acid, sodium alginate and chitosan oligosaccharide;

at least one component selected from the group consisting of water, ethanol and hydrogen peroxide; one or more component selected from the group consisting of sweet potato starch and wheat starch;

one or two components selected from the group consisting of acrylamide, polyvinyl amide, sodium polyacrylate, polyvinyl alcohol and potassium polyacrylate;

hydroxyethyl methacrylate; and potassium persulfate;

wherein the sample 3 comprises: at least one component selected from the group consisting of thioglycolic acid, tartaric acid, glycerol, humic acid and lysine;

at least one component selected from the group consisting of Water, hydrogen peroxide and ethanol;

at least one component selected from the group consisting of diglycolamine, acetamide, urea and ethanolamine;

borax or/and boric acid, zinc sulfate, ferrous sulfate, copper sulfate, manganese sulfate and ammonium molybdate.

* * * * *